United States Patent
Takatori et al.

[11] Patent Number: 5,646,753
[45] Date of Patent: Jul. 8, 1997

[54] DISPLAY SYSTEM

[75] Inventors: Sunao Takatori; Makoto Yamamoto, both of Tokyo, Japan

[73] Assignee: Yozan Inc., Tokyo, Japan

[21] Appl. No.: 540,151

[22] Filed: Oct. 6, 1995

Related U.S. Application Data

[63] Continuation of Ser. No. 174,001, Dec. 28, 1993, abandoned.

[30]    Foreign Application Priority Data

Dec. 28, 1992  [JP]  Japan ................... 4-361697

[51] Int. Cl.$^6$ ................ G02B 5/32; G03H 1/26; G02F 1/1335
[52] U.S. Cl. .............. 359/15; 359/22; 359/23; 349/13
[58] Field of Search .................. 359/22, 24, 465, 359/473, 40, 41, 42, 48, 49, 23, 32, 15; 348/56; 345/8; 351/240

[56]    References Cited

U.S. PATENT DOCUMENTS

| | | | |
|---|---|---|---|
| 4,281,341 | 7/1981 | Byatt | 359/465 |
| 4,462,661 | 7/1984 | Witt | 359/40 |
| 4,792,850 | 12/1988 | Lipton et al. | 359/465 |
| 4,807,978 | 2/1989 | Grinberg et al. | 359/24 |
| 5,011,244 | 4/1991 | Smith et al. | 359/22 |
| 5,103,325 | 4/1992 | Andrews et al. | 359/22 |
| 5,124,840 | 6/1992 | Trumbull et al. | 359/473 |
| 5,272,551 | 12/1993 | Lehureau et al. | 359/24 |
| 5,347,644 | 9/1994 | Sedlmayr | 359/465 |

OTHER PUBLICATIONS

"White Paper of Multi–media 1993", Multi–media Soft Promotion Association, pp. 150–153, 1993 (no translation).

TRiggER, vol. 12, No. 1, p. 18, 1993 (no translation).

*Primary Examiner*—Paul M. Dzierzynski
*Assistant Examiner*—Audrey Chang
*Attorney, Agent, or Firm*—Cushman, Darby & Cushman IP Group of Pillsbury Madison & Sutro LLP

[57]    ABSTRACT

A display system arranged closer than the focus point of the eyes. The display system comprises a hologram carrier for generating a virtual image by a hologram of a pixels' image arranged in two dimensions a light source for directing an incident light of a predetermined wavelength area to the hologram carrier, and a liquid crystal shutter selectively releasing and cutting-off an area of each pixel's image of the hologram carrier.

6 Claims, 1 Drawing Sheet

DISPLAY SYSTEM

This is a continuation of application Ser. No. 08/174,001, filed on Dec. 28, 1993, now abandoned.

FIELD OF THE INVENTION

The present invention relates to a display system, especially for an image positioned closer to the eyes than a focus distance of eyes.

BACKGROUND OF THE INVENTION

In recent years, it has become desirable for a display system, such as a display system in virtual reality application, to be positioned closely to the eyes. Since such display system is worn on the user's face, it should be light in weight as well as small in size. However, the system has to have a depth greater than the focus distance of eyes to enable the eyes to focus on the image displayed.

SUMMARY OF THE INVENTION

The present invention solves the conventional problems and provides a display system arranged closer than the distance of the focus point of the eyes.

A display system according to the present invention generates a virtual pixel matrix image by holography and selectively displays it through a liquid crystal shutter.

PREFERRED EMBODIMENT OF THE INVENTION

Hereinafter an embodiment of a display system according to the present invention is described with reference to the attached drawings.

Figure 1:
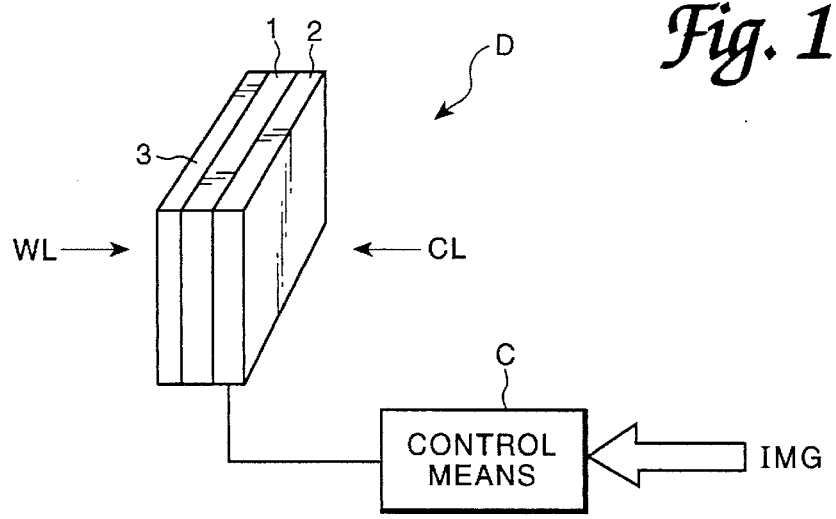
FIG. 1 is a conceptual diagram showing an embodiment of a display system according to the present invention.
Figure 2:
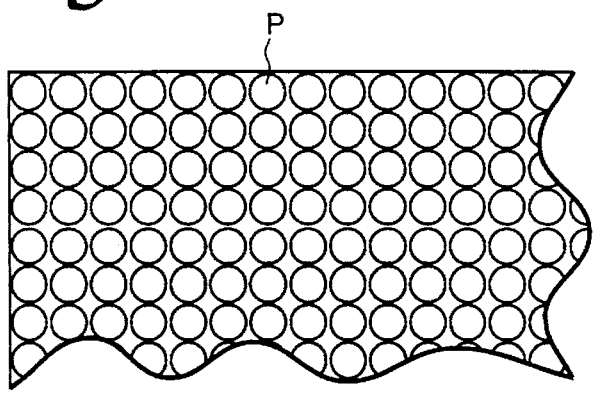
FIG. 2 is a conceptual diagram showing a virtual pixel matrix in the present invention.

FIG. 1 is a conceptual diagram of a display system. The display system D has a hologram carrier 1 and a liquid crystal shutter 2. A circular figure P shown by FIG. 2 is a virtual image of a two dimensional matrix generated by a hologram.

A liquid crystal shutter 2 releases and cuts-off in each part corresponding to each circle figure in a hologram, and the circle figure P as a pixel is displayed at a position where the liquid crystal shutter is opened. It is possible to display an image which has the figure P as a pixel if releasing and cutting-off of the liquid crystal shutter is set corresponging to an image to be displayed.

The displayed image is a virtual image generated by interference fringes. The virtual pixels appear as if they were far behind the hologram carrier, therefore the user can focus on the virtual image even when the interference fringes of the carrier are positioned nearer than the focus distance of the eyes.

A control means C provided outside enables the liquid crystal shutter to open or close, and the control means C performs opening and shutting by a well known means, corresponding to an image signal IMG.

The carrier 1 receives a light CL of a predetermined wavelength, or the light can be generated by converting a white light WL into a light of a predetermined wavelength by means of Filter 3. The carrier generates a hologram image in response to the light.

Figure 3:
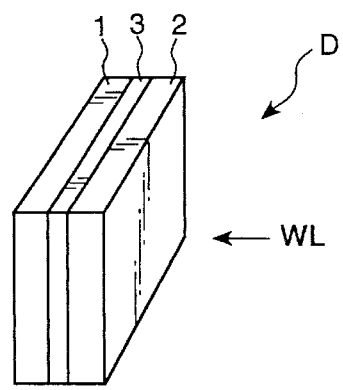
FIG. 3 is a second embodiment of the present invention.

Both a light penetrating type and a light reflecting type maybe used for hologram carrier 1. FIG. 1 shows a filter set in backside of the carrier 1, however, it is also possible to set it in the front side (inside) as shown in FIG. 3.

Figure 4:
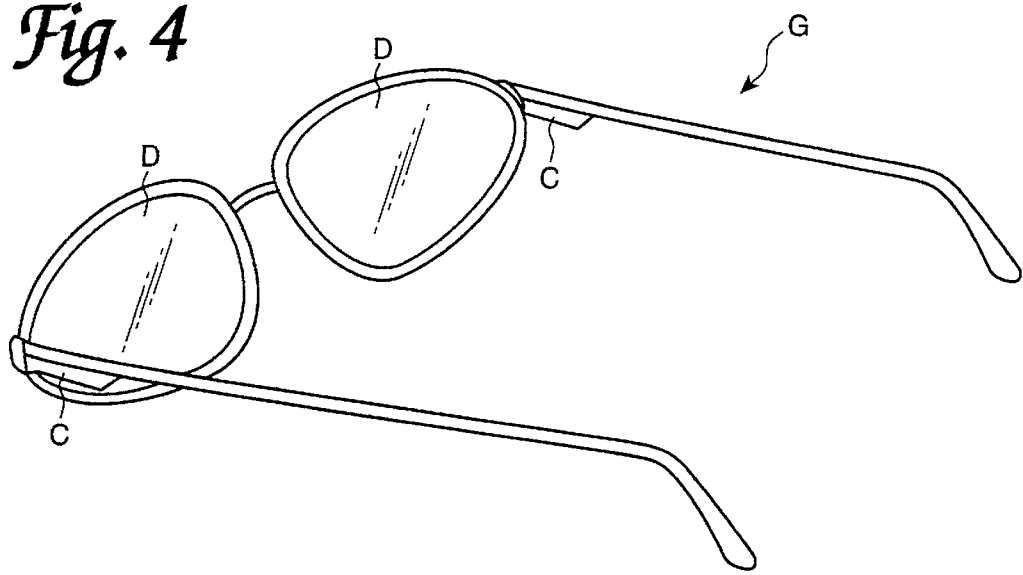
FIG. 4 is a pair of glasses showing an embodiment of the invention.

FIG. 4 shows a display system D mounted on the lens of glasses G, with a control means attached at the bows of the glasses. It can thus be appreciated that glasses G act as a support assembly for mounting display system D on the user at a distance relative to the user that is closer than the focus point of the user's eyes during normal operation of the system.

A display system with a small size can be realized and it is also possible to realize a 3-dimensional image display system of a small size when the right and left images are controlled corresponding to parallax.

As mentioned above, a display system according to the present invention generates a virtual image of pixel matrix by holography and selectively display it through a liquid crystal shutter, so as to provide a display system arranged closer than the focus point distance of the eyes.

What is claimed is:

1. A system for displaying an image by generating a virtual image, comprising:

i) a hologram carrier for generating a hologram of a two-dimensional pixel image;

ii) a light source for supplying an incident light of a predetermined wavelength to said hologram carrier;

iii) a liquid crystal shutter for selectively releasing and cutting-off an area of each pixel in said pixel image in response to an image control signal to generate said virtual image; and iv) means for supporting said hologram carrier and said liquid crystal shutter such that said hologram carrier and said liquid crystal shutter are mounted on a user at a position relative to said user that is closer than a focus point of said user's eyes during normal operation of said system.

2. A system for displaying an image by generating a virtual image, comprising:

i) a hologram carrier for generating a hologram of a two-dimensional pixel image;

ii) a filter for providing light of a predetermined wavelength from a light source to said hologram carrier;

iii) a liquid crystal shutter for selectively releasing and cutting-off an area of each pixel in said pixel image in response to an image control signal to generate said virtual image; and iv) means for supporting said hologram carrier, said filter, and said liquid crystal shutter such that said hologram carrier, said filter, and said liquid crystal shutter are mounted on a user at a positon relative to said user that is closer than a focus point of said user's eyes during normal operation of said system.

3. A system as claimed in claim 1 or 2, wherein said supporting means comprises a pair of glasses having lens openings, said liquid crystal shutter being disposed within said lens openings of said pair of glasses.

4. A system as claimed in claim 2, wherein said filter is located between said liquid crystal shutter and said hologram carrier.

5. A system as claimed in claim 2, wherein said hologram carrier is located between said filter and said liquid crystal shutter.

6. A system as claimed claim 1, wherein said light source includes a source of white light and a filter.

* * * * *

UNITED STATES PATENT AND TRADEMARK OFFICE
CERTIFICATE OF CORRECTION

PATENT NO.   : 5,646,753
DATED        : July 8, 1997
INVENTOR(S)  : TAKATORI et al.

It is certified that error appears in the above-identified patent and that said Letters Patent is hereby corrected as shown below:

ON THE COVER PAGE:
Reads:

[73]   Assignee:   Yozan Inc., Tokyo, Japan

Should Read:

[73]   Assignee:   Yozan Inc., Tokyo Japan
                              Sharp Corporation, Osaka, Japan Signed and Sealed this Thirteenth Day of January, 1998

Attest:

BRUCE LEHMAN

Attesting Officer      Commissioner of Patents and Trademarks